United States Patent
Chang

(10) Patent No.: US 8,098,612 B2
(45) Date of Patent: Jan. 17, 2012

(54) APPARATUS AND METHOD FOR REMOTE BEAM FORMING FOR SATELLITE BROADCASTING SYSTEMS

(75) Inventor: Donald Chin-Dong Chang, Thousand Oaks, CA (US)

(73) Assignee: Spatial Digital Systems, Inc., Chatsworth, CA (US)

( * ) Notice: Subject to any disclaimer, the term of this patent is extended or adjusted under 35 U.S.C. 154(b) by 861 days.

(21) Appl. No.: 12/122,462

(22) Filed: May 16, 2008

(65) Prior Publication Data

US 2008/0291864 A1 Nov. 27, 2008

Related U.S. Application Data

(60) Provisional application No. 60/930,943, filed on May 21, 2007.

(51) Int. Cl.
*H04B 7/185* (2006.01)
(52) U.S. Cl. ......................... 370/316; 370/532
(58) Field of Classification Search .......... 370/315–316, 370/338, 501, 532
See application file for complete search history.

(56) References Cited

U.S. PATENT DOCUMENTS

| 5,835,487 | A * | 11/1998 | Campanella | 370/316 |
| 6,823,170 | B1 * | 11/2004 | Dent | 455/13.3 |
| 7,786,933 | B2 * | 8/2010 | Chang | 342/357.63 |
| 2004/0022275 | A1 | 2/2004 | Blanchard | |
| 2004/0218681 | A1 | 11/2004 | McNeely | |
| 2008/0291079 | A1 * | 11/2008 | Chang | 342/174 |

* cited by examiner

*Primary Examiner* — Phuc Tran
(74) *Attorney, Agent, or Firm* — O'Melveny & Myers LLP

(57) ABSTRACT

A satellite broadcasting system is achieved in which remote beam forming processors located among distributed ground stations are used to control downlink beam footprints and pointing directions. Digital beam forming techniques allow a single satellite downlink broadcast antenna array to generate multiple simultaneous downlinks that can be pointed independently and that may contain distinct information content. By allocating some of the uplink back-channel elements as null channels, continuous calibration of the uplink channel can be performed, improving the performance of the downlink broadcast array and the quality of the broadcast for users. By wavefront multiplexing, all of the uplink channel elements propagate through the all of the available propagation channels simultaneously, eliminating the need for complex and costly individual array-element calibration equipment using on-board or ground-based references.

25 Claims, 4 Drawing Sheets

APPARATUS AND METHOD FOR REMOTE BEAM FORMING FOR SATELLITE BROADCASTING SYSTEMS

RELATED APPLICATION DATA

This application claims the benefit, pursuant to 35 U.S.C. §119(e), of U.S. provisional application Ser. No. 60/930,943, filed May 21, 2007.

BACKGROUND OF THE INVENTION

1. Field of the Invention

The present invention relates to satellite-based broadcasting systems. More particularly, it relates to systems for downlinking broadcast content data from satellites that are linked to ground-based uplink stations having remote beam-forming capability.

2. Description of Related Art

Systems for broadcasting audio and video data from satellites in geostationary orbit (GEO), medium-Earth orbit (MEO), and low-Earth orbit (LEO) to ground-based users are well known in the art. Such systems generally rely on one or more ground-based uplink facilities to uplink content to the satellite. The satellite then downlinks the content to individual users in selected geographical areas. Some systems employ shaped reflectors to develop a downlink beam pattern to illuminate the selected region. Others employ multiple antennas or antennas with multiple elements in order to configure the footprint of the downlink beams.

However, nearly all of such systems are fixed at the time the satellite is launched and cannot be upgraded to keep pace with more advanced ground systems. Even those systems that maintain some satellite configurability must be controlled by complex systems on board the satellite and thus have inherently limited flexibility. Thus, it would be useful to provide a system with a radiation pattern that can be configured and controlled by ground-based uplink stations. In particular, it would be useful to provide a system that uses remote ground-based digital beam forming (DBF) systems to cause direct-broadcast satellites to radiate multiple downlink beams with configurable shapes pointing in configurable directions.

SUMMARY OF THE INVENTION

A satellite broadcasting system is achieved that provides multiple simultaneous downlinks controlled by remote digital beam forming (DBF) processors employed at distributed, ground-based uplink stations. The system enables the formation of configurable downlink radiation patterns covering selected service areas, enables the use of multiple simultaneous downlinks that may carry different content to different geographic regions, and minimizes the impact of differential phase and amplitude drift between uplink signal elements.

An embodiment of a satellite broadcasting system in accordance with the present invention includes a satellite segment, a ground segment, and a user segment. The satellite segment includes one or more satellites having a downlink broadcast antenna array. An embodiment of such a downlink broadcast antenna array having ten radiating elements is described in detail below, but more generally, the downlink broadcast antenna array comprises N elements, where N is a positive integer greater than one.

The satellite segment also includes a wavefront de-multiplexer having at least N outputs configured to drive corresponding ones of the N downlink broadcast antenna array elements. The wavefront de-multiplexer is a device with M inputs and M outputs, where M is an integer greater than or equal to N and configured to perform a spatial Fourier transform of its inputs. N of the M transformed outputs are used to drive the N downlink broadcast antenna array elements. If M is greater than N, the remaining M-N outputs of the wavefront de-multiplexer are used to drive an optional cost-function unit that is adapted to measure imbalances in uplink back-channels used to uplink audio, video or other content to the satellite segment for subsequent downlink to the user segment. The operation of the optional cost function unit is described in more detail below.

The wavefront de-multiplexer can be implemented in a number of ways, including by employing an M-by-M Butler Matrix, well known in the art. In the detailed description that follows, a system is described that uses a 16-by-16 Butler Matrix, but more generally, an M-by-M Butler Matrix may be used where M is an integer greater than or equal to N. The inputs to the M-dimensional wavefront de-multiplexer are produced by a frequency-domain de-multiplexer that operates on frequency-domain multiplexed (FDM) uplink signals received from the ground segment. The FDM signals from the ground segment are de-multiplexed into M components, and each of the M components is frequency converted to a selected downlink frequency for subsequent transmission over the downlink broadcast antenna array.

The ground segment comprises one or more ground terminals for uplinking audio, video, or other content to the satellite segment for subsequent downlink to the user segment. An embodiment of a ground terminal in accordance with the present invention includes at least one digital beam forming (DBF) processor that is configured to encode amplitude and phase information onto a data stream such that a coherent beam is formed by the downlink broadcast antenna of the satellite segment. A stream of baseband content data is multiplied by an N-component beam weight vector (BWV) to create an N-component product vector. An embodiment described in detail below uses a ten-component BWV corresponding to the ten elements of the downlink broadcast antenna array in that embodiment. However, more generally, a system including an N-element downlink broadcasting antenna array on a broadcast satellite will use N-component BWVs to properly weight baseband content data.

The N-component product vector is then padded with nulls to create an M-component product vector, where M is an integer greater than or equal to N. For example, in an embodiment described in detail below, M is sixteen and N is ten. The M-component product vector, consisting of N signals and M-N nulls, is then processed by an M-by-M wavefront multiplexer that performs an M-component spatial Fourier transform. The M-component output of the wavefront multiplexer is then passed through M analog-to-digital converters to produce M analog waveforms. Each of the M analog waveforms is frequency up-converted to a different frequency near the selected uplink frequency. In an embodiment described in detail below, the uplink center frequency is selected to be 6 GHz, and the sixteen analog waveforms are up-converted to frequencies spaced by 62.5 MHz and extending from 5.5 GHz to 6.5 GHz. More generally, however, the center frequency can be selected to be any frequency known to be useful for satellite communications, such as S-band, C-band, X-band, Ku-band, or Ka-band. The spacing between the frequencies likewise may be selected according to the bandwidth requirements of the application.

The M up-converted signals are then combined into frequency-domain multiplexed (FDM) uplink signals, and these uplink signals are transmitted as back-channel signals to the satellite segment through a feeder link at C-band, in this embodiment. After processing through the satellite segment as described previously, the signals encoded with the BWV are applied to the elements of the downlink broadcast antenna array. The amplitude and phase profiles encoded in the BWV create a beam that adds coherently in a particular direction and that exhibits a particular pattern shape. Changing the BWV coefficients applied by the ground segment thus changes the pointing of the downlink from the satellite segment. Within the ground segment, multiple content streams may be multiplied by multiple BWVs to create multiple beams when the signals are subsequently applied to the satellite segment downlink broadcast antenna array. Thus, the ground segment controls the pointing and shaping of multiple simultaneous beams downlinked from the satellite segment.

For the case in which M is chosen to be larger than N such that the N-component product vector created in the ground segment is padded by one or more nulls, the cost function unit mentioned above allows calibration and monitoring of the uplink channel, enabling improved downlink performance of the system. When the back-channel signals embedded in the uplinked beam is received and amplified by the satellite system, frequency converted to the broadcast frequency (typically Ku or S band), and run through the wavefront de-multiplexer, the original N data streams (each modulated by corresponding components of the BWV) are recovered, including the M-N null channels. For a completely balanced feeder link with multiple back channels having identical propagation delays and attenuations, the M-N recovered channels will contain no signals. However, in reality, imbalances and differential propagation characteristics among various channels will cause some energy to leak into the null outputs of the wavefront de-multiplexer. By monitoring the null channels, changes can be made dynamically to the amplitudes and phases of the signals entering the wavefront de-multiplexer to correct for these imbalances and to produce true nulls where expected. Alternatively, the null energy monitored by the cost function unit can be downlinked back to the ground segment via a separate backchannel, and the ground segment can accordingly pre-compensate for the measured imbalances by adjusting the amplitudes and phases of the signals emerging from the wavefront multiplexer on the ground segment. Thus, the use of one or more null channels in the uplink enables continuous calibration and monitoring of the uplink channel, assuring that the downlink beams are formed properly and cleanly.

By contrast, without the wavefront multiplexing feature provided by the present invention, each weighted element signal would propagate through a unique backchannel in the feeder link. The differential propagation characteristics of each channel would modulate the weighted element signals differently in both amplitude and phase. Depending on the frequency band of the feeder link, these effects could significantly distort the shape of the broadcast beam.

The wavefront multiplexing scheme, however, directs each of the N weighted element signals generated by the remote beam-forming facility on the ground to go through all of the M propagation channels simultaneously and in parallel. Thus, the channel effects are spread across the entire feeder link bandwidth and across all of the N weighted element signals, reducing the potential distortion effects by a factor of the square root of M, or four for the example discussed below having M equal to sixteen.

From the foregoing discussion, it is clear that certain advantages have been achieved for a satellite broadcast system that utilizes ground-based remote digital beam forming. Further advantages and applications of the invention will become clear to those skilled in the art by examination of the following detailed description of the preferred embodiment. Reference will be made to the attached sheets of drawing that will first be described briefly.

DETAILED DESCRIPTION OF THE PREFERRED EMBODIMENT

The invention provides a direct satellite broadcast system that includes a remote ground-based beam-forming facility. Beam-forming information is encoded into audio, video, or other content within the ground-based uplink facility. It is then uplinked to one or more satellites and downlinked via a segmented downlink broadcast antenna array. Beam-forming information encoded on the ground creates multiple downlink beams appearing at the satellite's downlink broadcast antenna array, allowing control over which content is radiated to which ground-based users.

Figure 1:
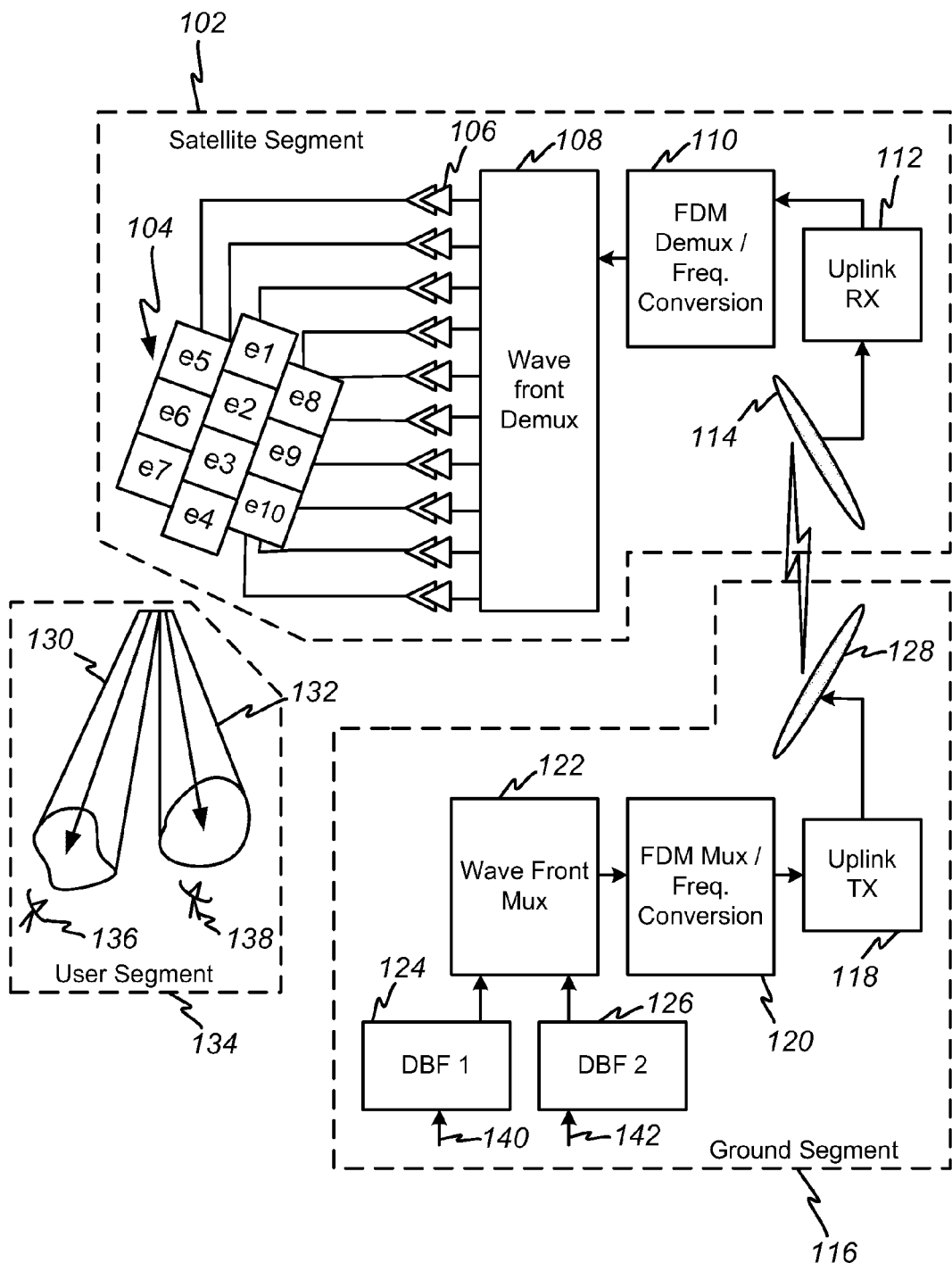
FIG. 1 depicts a direct broadcast system comprising a ground segment, a satellite segment, and a user segment in accordance with the present invention.

FIG. 1 depicts a block diagram of a direct broadcast system in accordance with the present invention. The ground segment 116 includes a first digital beam forming (DBF) processor 124 and a second DBF processor 126. Content data 140 enters the first DBF processor 124, and content data 142 enters the second DBF processor 126. The two content streams may be identical or may be distinct, depending on the particular broadcast application. The first DBF processor applies a set of beam weight vectors (BVWs) to the content data 140 that correspond to a particular selected footprint for a first beam 130 that will be downlinked from the satellite segment 102. The second DBF processor 126 similarly applies an independent set of BWVs to the content data 142 that correspond to a separate distinct footprint for a second beam 132 that will be downlinked by the satellite segment 102. The content data, now encoded with beam footprint and pointing information, is sent to a wavefront multiplexer 122. The wavefront multiplexer 122, described more fully with respect to FIG. 2 below, performs a spatial Fourier transform (FT) of the encoded content data to produce multiple baseband uplink signals. The multiple baseband signals are then frequency up-converted 120 to several closely-spaced uplink carriers and combined into a composite frequency-domain multiplexed (FDM) uplink signal. To save bandwidth, two FDM multiplexers may be used to create two half-bandwidth streams, each with an orthogonal polarization such as vertical and horizontal linear polarization, or right-hand circular polarization (RHCP) and left-hand circular polarization (LHCP). The uplink signal is then amplified 118 and radiated to one or more satellites via an uplink antenna 128. It should be noted that while the above description refers to a ground segment including two DBF processors for encoding two content data streams, other numbers of DBF processors are possible and would fall within the scope and spirit of the present invention.

The satellite segment 102 receives the uplinked FDM signal via an uplink receive antenna 114. The uplink signal is amplified 112 and sent through an FDM receiver 110 that de-multiplexes the closely spaced carriers and frequency converts them to the satellite segment downlink frequency. The de-multiplexed and frequency-converted signals are then passed through a wavefront de-multiplexer 108, described more fully with respect to FIG. 3 below, that performs a spatial FT of the received signals. The outputs of the wavefront de-multiplexer 108 are amplified 106 and routed to elements of an downlink broadcast antenna array 104. The BWVs that were encoded into the two beams by the ground segment facility 116 operate to generate two independent downlink beams 130 and 132 in the user segment 134. The footprints of the two downlink beams 130 and 132 can be controlled by the ground segment 116 to illuminate geographically separated users 136 and 138. The ground segment 116 can also control which digital content is sent to user groups 136 and 138 by varying the inputs 140 and 142 to the two DBF processors 124 and 126.

It should be noted that while the embodiment described above employed two DBF processors to encode two uplink content streams, more than two DBF processors and content streams may also be used to create more than two downlink beams. Such systems employing multiple DBF processors would also fall within the scope and spirit of the present invention.

Figure 2:
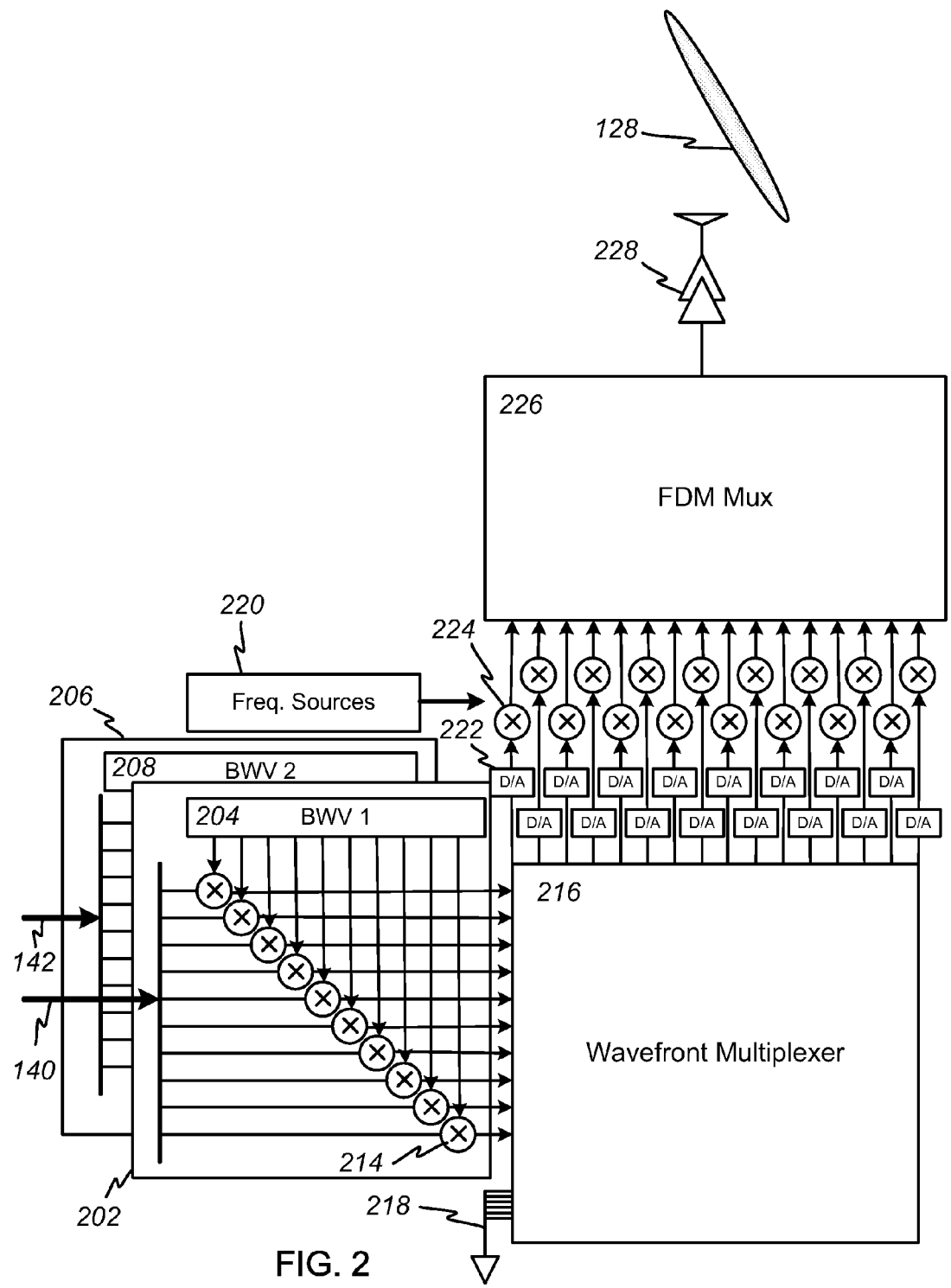
FIG. 2 is a block diagram of an embodiment of the ground segment of a satellite broadcast system in accordance with the present invention.

FIG. 2 presents a more detailed block diagram of an embodiment of a ground segment portion of a digital broadcast system in accordance with the present invention. The two content data streams 140 and 142 are depicted as inputs to a first DBF processor 202 and a second DBF processor 206. In the embodiment depicted in FIG. 2, the digital content stream 140 is split into ten portions that are multiplied by components of a ten-dimensional first BWV 204. Each of the ten components of the first BWV 204 is a complex number containing both an amplitude piece and a phase piece. The specific values of the BWV are chosen to create a particular beam footprint from the downlink transmission antenna of the satellite segment, as will be more fully described below with reference to FIG. 3. The content data stream 140 is multiplied 214 by the first set of BWVs 204, and the encoded contents are then routed to a wavefront multiplexer 216.

At the same time, the second input content stream 142 is multiplied by a second set of BWVs 208 in the second DBF processor 206 to create an independent second beam in the satellite segment. Note that altering the values of the second set of BWVs 208 will change the footprint and pointing direction of the second beam generated by the satellite segment but will not have an effect on the first beam. After multiplication by the second BWV 208, the outputs of the second DBF 206 are combined with those of the first DBF 202 on an element-by-element basis, and the combination is routed to the inputs of the wavefront multiplexer 216.

The wavefront multiplexer 216 takes the input elements, encoded with amplitude and phase pointing data, and performs a spatial Fourier transform (FT). The wavefront multiplexer 216 can be implemented in many ways, such as by a sixteen-by-sixteen Butler Matrix, well known in the art. Note that for the embodiment depicted in FIG. 2, only ten of the inputs of the wavefront multiplexer 216 are used while all sixteen outputs are used. The remaining six inputs are set to null inputs, as shown schematically at 218. As will be described in more detail below with reference to FIG. 3, the zero-input channels will allow for continuous calibration, equalization, and optimization of the dynamic propagation effects of the uplink back-channels in the feeder link, enabling improved system performance. Wavefront multiplexers of sizes other than sixteen by sixteen may also be used, different numbers of unused inputs may also be employed, and continuous calibration may be performed as long as the number of wavefront multiplexer signal inputs is less than the number of outputs. In more general terms, the number of signal inputs to the wavefront multiplexer will be N, and the number of outputs will be M, where N and M are positive integers greater than one. When M is greater than N, continuous calibration techniques may be used, as the number of null inputs to the wavefront multiplexer will be M-N. The downlink broadcasting antenna array 104 will comprise N elements, corresponding to the N signal inputs to the wavefront multiplexer. Such alternately sized systems would also fall within the scope and spirit of the present invention.

By forming a Fourier transform, the wavefront multiplexer has the effect of mixing each of the ten inputs into each of the sixteen outputs. Thus, each of the ten input element signals goes through all of the sixteen output channels, and each of the zero-input channels also goes through all of the sixteen output channels. In the subsequent ground processing, uplinking to the satellite element, and processing in the satellite, portions of the null-input signals thus sample each of the sixteen uplink channels and can be used to correct for dynamic channel-specific propagation effects and imbalances.

The outputs of the wavefront multiplexer 216 are run through digital-to-analog converters 216 that synthesize analog waveforms. The analog waveforms are then frequency up-converted 224 by a series of closely spaced carrier frequencies in the feeder-link uplink frequency band and generated by frequency sources 220. The uplink frequency may be any frequency spectrum useful for satellite communications, such as S-band, C-band, X-band, Ku-band, or Ka-band. For purposes of illustration, the uplink will be assumed to be C-band at 6 GHz. The sixteen output channels are then frequency up-converted by sixteen carriers separated by 62.5 MHz and extending from 5.75 GHz to 6.25 GHz. Other channel spacings can be used depending on the bandwidth requirements of the application. The separate carriers are then combined into two 500-MHz-wide C-band signals by low-loss frequency-domain multiplexers (FDMs) 226. The FDM carrier is then amplified 228 by a solid-state power amplifier, traveling wave-tube amplifier (TWTA), klystron, or other radio-frequency amplifier known in the art, and transmitted via an uplink transmit antenna 128. The two 500-MHz C-band signals are uplinked to the designated satellite using polarization diversity. For example, one signal may be horizontally polarized and the other vertically polarized. Or one may be right-hand circularly polarized (RHCP) and the other left-hand circularly poralized (LHCP).

Note that the ground segment described above may operate by itself or in conjunction with multiple ground segments having similar configurations. As long as their uplink frequencies are separated, multiple ground segments can be used to uplink content to the same satellite or group of satellites.

Figure 3:
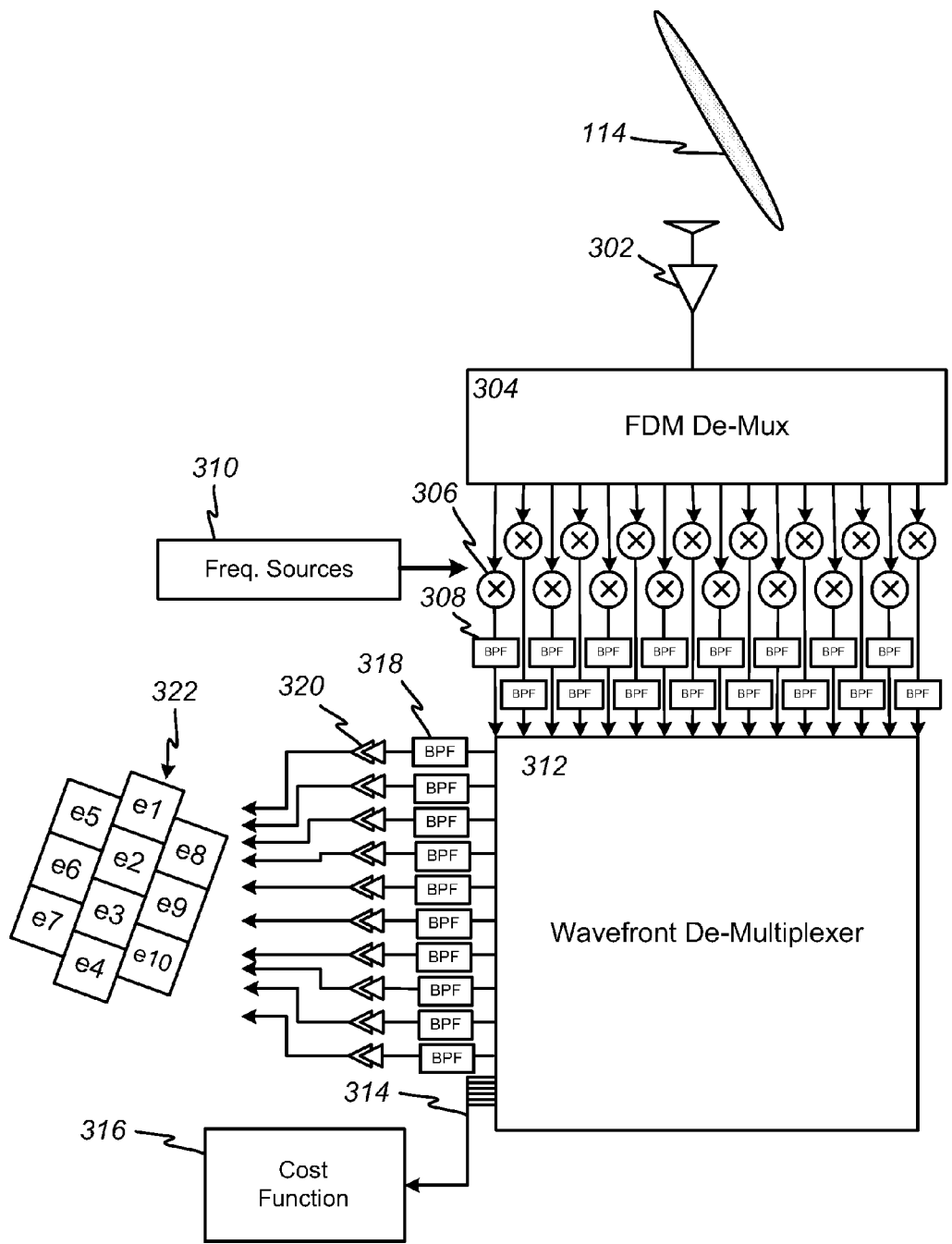
FIG. 3 is a block diagram of an embodiment of the satellite segment of a satellite broadcast system in accordance with the present invention.

FIG. 3 depicts a more detailed view of an embodiment of the satellite segment of a direct broadcast system in accordance with the present invention. The uplink receive antenna 114 receives the C-band FDM uplink signal from the ground segment depicted in FIG. 2. Note that frequencies other than C-band may be used for the uplink feeder links and still fall within the scope and spirit of the present invention. On the broadcasting satellite, the two FDM uplinked signals are amplified by low-noise amplifiers 302 and sent to two FDM de-multiplexers 304 that split the 6 GHz FDM signals into constituent carriers, spaced 62.5 MHz apart. Of course, different frequency spacings of the constituent pieces of the uplink carrier may be used within the scope of the present invention.

The sixteen individual components of the uplink carrier are then passed through sixteen frequency converters 306 that frequency-shift the uplink elements to the broadcast downlink frequency, here assumed to be S-band. However, other satellite broadcast downlink frequencies such as Ku-band or Ka-band may also be used.

The outputs of the frequency converters 306 are the sixteen channel signals, all at S-band in this embodiment. The sixteen channels are passed through band-pass filters 308 and then enter a wavefront de-multiplexer 312 that performs a spatial Fourier transform (FT) of the sixteen uplinked channels. The transformation performed in the wavefront de-multiplexer 312 is essentially the opposite of that performed in the wavefront multiplexer 216 in the ground segment. Thus, ten element signals are recovered, are filtered by band-pass filters 318, are amplified by solid-state power amplifiers 320 or other radio-frequency amplifiers, and are routed to corresponding radiating elements of the downlink broadcast antenna array 322. The amplitude and phase profiles imparted to the signals by the ground-based DBF processors then cause the fields radiated by the downlink broadcast antenna array 322 to combine constructively and destructively converage areas. The satellite segment itself is relatively uncomplicated and simply passes through the beam-forming encoding generated by the ground segment. This keeps most of the complexity and control on the ground, where it is easily accessible for upgrades, maintenance, and reconfiguration as required.

As the sixteen uplink element signals pass through the wavefront de-multiplexer 312, the six null channels 314 are also recovered along with the ten signal channels. If all of the processing and propagation channels for the sixteen radiated signal elements were identical, the null channels would output nothing. However, imbalances in attenuation levels, phase delays and other propagation effects of the various uplink back channels will tend to cause energy to leak into the null channels 314. Thus, they become observables that can be used to measure and correct for imbalances in the uplink back channels. The null channels 314 are routed to a cost function processor 316 that calculates compensation weight vectors (CWVs) to compensate for propagation effects. These correction vectors may be applied on board the satellite segment to correct the received uplink signals, or alternatively, could be downlinked back to the ground segment via a separate backchannel to allow the ground segment to pre-compensate the uplink elements before transmission to the satellite.

As noted previously, a system in accordance with the present invention need not employ ten signal channels, sixteen uplink element signals, and six null channels. In more general terms, a system may comprise N signal channels and M uplink element signals, where M and N are positive integers greater than one. If the continuous calibration method is to be used, M must be greater than N, and the number of null channels is equal to M-N. However, systems for which M is equal to N and no continuous calibration is performed would also fall within the scope and spirit of the present invention.

Figure 4:
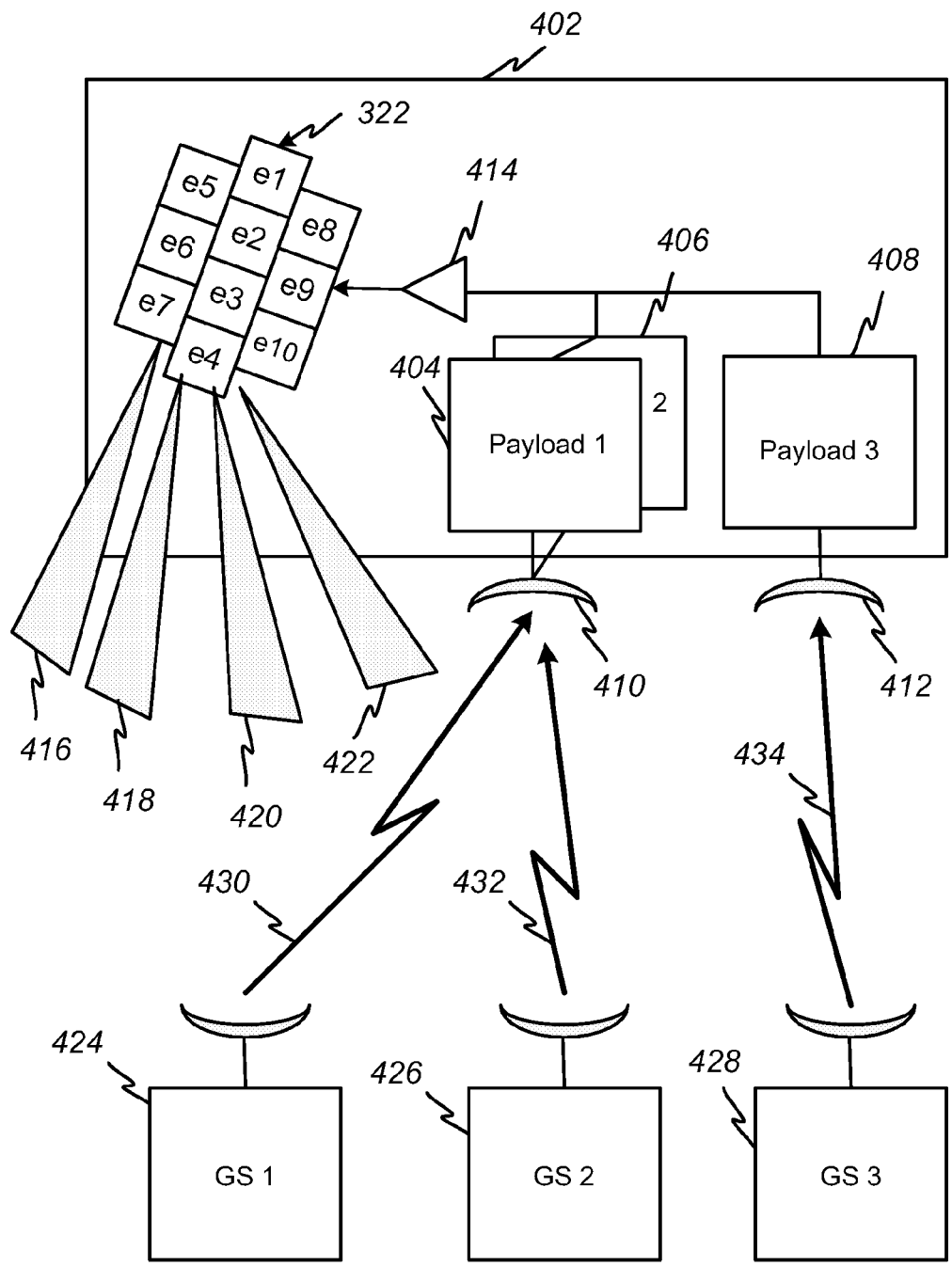
FIG. 4 depicts an example of a satellite broadcast system in which multiple distributed ground stations communicate with a satellite segment to produce multiple simultaneous downlinks in accordance with the present invention.

FIG. 3 depicts a single uplink-downlink processor on board the satellite driving the downlink broadcast antenna array 322. However, multiple uplink-downlink processors may be used simultaneously with the same downlink broadcast antenna array 322. FIG. 4 illustrates an embodiment of such a system including multiple satellite payloads all driving the same downlink broadcast antenna array 322. The embodiment depicted in FIG. 4 includes a satellite segment 402 that comprises a downlink broadcast antenna array 322 driven by a set of power amplifiers 414 that are themselves driven by signals from a first 404, second 406, and third 408 payload element. Each of the payload elements 404, 406, and 408, includes the components depicted in the system of FIG. 3.

The satellite segment 402 interacts with a ground segment that includes three ground stations 424, 426, and 428. Each of the ground stations generates an uplink signal 430, 432, and 434, that is distinct in broadcasting frequency from the uplink signals generated by the other two ground stations. In the embodiment depicted here, two of the uplinks are directed toward an uplink receive antenna 410 that is shared by the first payload element 404 and the second payload element 406. The uplink frequency difference between uplinks 430 and 432 allow the satellite segment to distinguish between the two. The first uplink 404 is processed by the first payload element 404 to generate ten drive signals that are sent to the downlink broadcast antenna array 322. Similarly, the second uplink 432 is processed by the second payload 406 to generate an additional ten drive signals that are also applied to the downlink broadcast antenna array 322. Finally, the third uplink 434, is received by a second satellite-segment uplink-receive antenna 412, which might be pointing to a different coverage area than the other uplink-receive antenna 410. The third uplink 434 is processed by the third payload element 408 and an additional ten drive signals are produced that are amplified by the amplification stage 414 and routed to the same downlink broadcasting antenna array 322. The three beams can be controlled independently and may broadcast different content data either by maintaining spatial separation of coverage areas while using the same frequency spectral band, overlapped coverage areas with frequency-separated broadcasting channels, or a combination of both. When overlapping coverage areas are used, other techniques, such as orthogonal coding, e.g. CDM, or time domain multiplexing (TDM) can be used.

The digital beam formers in each of the ground stations 424, 426, and 428 encode their respective uplinks with proper phase and amplitude profiles such that when converted to downlink frequency and radiated by the downlink broadcast array 322, the signals from downlink elements will add nearly coherently only in the selected coverage area for each of the beams created by the ground stations 424, 426, and 428. Thus, the downlink broadcast antenna array is able to radiate multiple, simultaneous beams 416, 418, 420, and 422 pointing to independent coverage areas, including different broadcast data, and optionally including broadcasting beams with slowly configurable coverage areas to accommodate satellites in slightly inclined geostationary orbits. Thus, the complexity associated with pointing multiple simultaneous beams, establishing appropriate footprints, and managing which content is downlinked to which geographic regions is largely controlled by the ground segment. This simplifies the satellite segment and greatly improves the configurability of the direct broadcast system.

Thus, a direct broadcast system is achieved in which remote beam forming processors located among distributed ground stations may be used to control downlink beam footprints and pointing directions. Digital beam forming techniques allow a single satellite downlink broadcast antenna array to generate multiple simultaneous downlink beams that can be shaped and pointed independently and that may carry distinct information content. By allocating some of the uplink channel elements as null channels, continuous calibration of the uplink channel can be performed, improving the performance and quality of the downlink broadcasting efficiency for user segments. Those skilled in the art will likely recognize further advantages of the present invention, and it should be appreciated that various modifications, adaptations, and alternative embodiments thereof may be made within the scope and spirit of the present invention. The invention is further defined by the following claims.

What is claimed is:

1. For an integer N that is greater than one and an integer M that is greater than N−1, a satellite broadcasting system includes:
    a satellite segment comprising:
        a downlink broadcast antenna array including N elements;
        a wavefront de-multiplexer having at least N outputs configured to drive corresponding ones of the N downlink broadcast antenna array elements, and M inputs;
        a frequency-domain de-multiplexer unit configured to demultiplex and frequency-convert uplink signals; and
        an uplink receive antenna configured to receive the uplink signals;
    a ground segment comprising:
        at least one digital beam forming (DBF) processor configured to multiply a content data stream with an N-component beam weight vector (BWV) to create an N-component product vector;
        a wavefront multiplexer having at least N inputs driven by corresponding ones of the N-component product vector, and M outputs;
        a frequency-domain multiplexer unit configured to frequency up-convert and modulate the M outputs of the wavefront multiplexer to generate the uplink signals; and
        an uplink transmit antenna configured to transmit the uplink signals; and
    a user segment comprising at least one user receiving at least one beam from the downlink broadcast antenna array of the satellite segment.

2. The satellite broadcasting system of claim 1, wherein:
    the at least one DBF processor of the ground segment further includes an N-component complex multiplier configured to multiply the content data stream with the N-component BWV; and
    the N-component BWV further comprises N configurable complex coefficients, each of which includes an amplitude portion and a phase portion.

3. The satellite broadcasting system of claim 1, wherein the wavefront multiplexer of the ground segment comprises an M-by-M Butler matrix.

4. The satellite broadcasting system of claim 1, wherein the wavefront de-multiplexer of the satellite segment comprises an M-by-M Butler matrix.

5. The satellite broadcasting system of claim 1, wherein the frequency-domain multiplexer unit of the ground segment further comprises:
    M digital-to-analog converters adapted to synthesize M analog waveforms from corresponding ones of the M outputs of the wavefront multiplexer;
    M frequency up-converters adapted to frequency up-convert corresponding ones of the M analog waveforms to radio frequency; and
    a frequency multiplexer adapted to combine the M analog waveforms after up-conversion to radio frequency to form composite signals that are the uplink signals.

6. The satellite broadcasting system of claim 1, wherein the ground segment is further adapted to include at least one of a solid-state power amplifier, a traveling wave-tube amplifier, and a klystron to amplify the uplink signals before transmission by the uplink transmit antenna.

7. The satellite broadcasting system of claim 1, wherein the frequency-domain de-multiplexer unit of the satellite segment further comprises:
    a de-multiplexer adapted to extract M analog uplink waveforms from the uplink signals received by the uplink receive antenna; and
    M frequency converters adapted to frequency convert corresponding ones of the M analog uplink waveforms to a downlink radio frequency.

8. The satellite broadcasting system of claim 1, wherein the satellite segment is further adapted to include at least N solid-state power amplifiers connected to corresponding ones of the at least N outputs of the wavefront de-multiplexer.

9. The satellite broadcasting system of claim 1, wherein:
    the wavefront multiplexer of the ground segment is further adapted to include M-N null inputs;
    the satellite segment further includes a cost function unit having M-N inputs; and
    the wavefront de-multiplexer of the satellite segment is further adapted to include M-N outputs that are connected to corresponding ones of the M-N inputs of the cost function unit;
    wherein M is further constrained to be greater than N; and
    wherein the cost function unit is adapted to measure a deviation of the M-N inputs of the cost function unit from null in order to measure imbalances in an uplink channel.

10. The satellite broadcasting system of claim 9, wherein the satellite segment is further adapted to correct for measured imbalances in the uplink channel by adjusting phases and amplitudes of outputs of the frequency-domain de-multiplexer unit.

11. The satellite broadcasting system of claim 9, wherein:
    the satellite segment is further adapted to downlink an index of measured imbalances in the uplink channel to the ground segment; and
    the ground segment is further adapted to pre-compensate for the index of measured imbalances in the uplink channel by adjusting phases and amplitudes of inputs of the frequency-domain multiplexer unit.

12. For an integer N that is greater than one and an integer M that is greater than N, a satellite broadcasting system includes:
    a satellite segment comprising:
        a downlink broadcast antenna array including N elements;
        a cost function unit adapted to measure deviations from null;
        a receive-side Butler Matrix having M inputs and M outputs, wherein N of the M outputs are configured to drive corresponding ones of the N downlink broadcast antenna array elements, and the other M-N outputs are configured to drive the cost function unit;

a frequency-domain de-multiplexer unit configured to demodulate and frequency-convert uplink signals; and an uplink receive antenna configured to receive the uplink signals;

a ground segment comprising:

at least one digital beam forming (DBF) processor configured to multiply a content data stream with an N-component beam weight vector (BWV) to create an N-component product vector;

a transmit-side Butler Matrix having M inputs and M outputs, wherein N of the M inputs are driven by corresponding ones of the N-component product vector, and the other M-N inputs are driven by null signals;

a frequency-domain multiplexer unit configured to frequency up-convert and modulate the M outputs of the receive-side Butler Matrix to generate the uplink signals; and an uplink transmit antenna configured to transmit the uplink signals; and a user segment comprising at least one user receiving at least one beam from the downlink broadcast antenna array of the satellite segment.

13. The satellite broadcasting system of claim 12, wherein:
the at least one DBF processor of the ground segment further includes an N-component complex multiplier configured to multiply the content data stream with the N-component BWV; and
the N-component BWV further comprises N configurable complex coefficients, each of which includes an amplitude portion and a phase portion.

14. The satellite broadcasting system of claim 13, wherein the frequency-domain multiplexer unit of the ground segment further comprises:

M digital-to-analog converters adapted to synthesize M analog waveforms from corresponding ones of the M outputs of the transmit-side Butler Matrix;

M frequency up-converters adapted to frequency up-convert corresponding ones of the M analog waveforms to radio frequency; and a multiplexer adapted to combine the M analog waveforms after up-conversion to radio frequency to form composite signals that are the uplink signals.

15. The satellite broadcasting system of claim 12, wherein the ground segment is further adapted to include at least one of a solid-state power amplifier, a traveling wave-tube amplifier, and a klystron to amplify the uplink signals before transmission by the uplink transmit antenna.

16. The satellite broadcasting system of claim 12, wherein the frequency-domain de-multiplexer unit of the satellite segment further comprises:

a de-multiplexer adapted to extract M analog uplink waveforms from the uplink signals received by the uplink receive antenna; and M frequency converters adapted to frequency convert corresponding ones of the M analog uplink waveforms to a downlink radio frequency.

17. The satellite broadcasting system of claim 12, wherein the satellite segment is further adapted to include N solid-state power amplifiers connected to N of the M outputs of the receive-side Butler Matrix.

18. The satellite broadcasting system of claim 12, wherein:
the cost function unit is adapted to measure a deviation of the M-N inputs of the cost function unit from null in order to measure imbalances in an uplink channel; and
the satellite segment is further adapted to correct for the measured imbalances in the uplink channel by adjusting phases and amplitudes of outputs of the frequency-domain de-multiplexer unit.

19. The satellite broadcasting system of claim 12, wherein:
the cost function unit is adapted to measure a deviation of the M-N inputs of the cost function unit from null in order to measure imbalances in an uplink channel;
the satellite segment is further adapted to downlink the measured imbalances in the uplink channel to the ground segment; and
the ground segment is further adapted to pre-compensate for the measured imbalances in the uplink channel by adjusting phases and amplitudes of inputs of the frequency-domain multiplexer unit.

20. For an integer N that is greater than one and an integer M that is greater than N, in a satellite broadcasting system comprising a ground segment, a user segment, and a satellite segment including at least one downlink broadcast antenna array having N elements, a method of generating multiple simultaneous beams from the downlink broadcast antenna array that are controlled by the ground segment comprises:

multiplying input content data streams by N-component beam weight vectors (BWVs) to create N-component product vectors in the ground segment;

padding the N-component product vectors with nulls until the product vectors reach a dimension of M;

creating an element-by-element sum of the M-component product vectors after padding to create an M-component composite vector;

performing an M-component spatial Fourier transform on the M-component composite vector to create an M-component transformed vector;

frequency up-converting the M-component transformed vector by mixing each of M components of the M-component transformed vector with M distinct closely spaced carrier frequency references to create M radio-frequency signals;

combining the M radio-frequency signals into composite frequency-domain-multiplexed (FDM) uplink signals;

transmitting the FDM uplink signals to a satellite;

de-multiplexing the uplink signals after receipt by the satellite;

frequency converting the uplink signals after de-multiplexing by mixing M components of the uplink signals after de-multiplexing with M distinct closely spaced frequency references to create an M-component downlink vector;

performing a spatial Fourier transform of the M-component downlink vector to create an M-component transformed downlink vector;

applying N of M components of the M-component transformed downlink vector to corresponding ones of the N array elements of the downlink broadcast antenna array.

21. The method of claim 20, wherein the step of performing an M-component spatial Fourier transform on the M-component composite vector further comprises running the M-component composite vector through an M-by-M Butler Matrix.

22. The method of claim 20, wherein the step of performing a spatial Fourier transform of the M-component downlink vector further comprises running the M-component downlink vector through an M-by-M Butler Matrix.

23. The method of claim 20, wherein the step of applying N of M components of the M-component transformed downlink vector to corresponding ones of the N array elements of the downlink broadcast antenna array further comprises:

applying the remaining M-N components of the M-component transformed downlink vector to a cost function unit; and measuring a deviation of the remaining M-N components from null in order to calculate uplink channel imbalances.

24. The method of claim 23, further comprising correcting for uplink channel imbalances by applying corrections to amplitudes and phases of the M-component downlink vector.

25. The method of claim 23, further comprising:

downlinking uplink channel imbalances to the ground segment;

correcting for uplink channel imbalances by applying pre-corrections to amplitudes and phases of the M-component transformed vector.

* * * * *